(12) United States Patent
Suzuki et al.

(10) Patent No.: US 11,461,501 B2
(45) Date of Patent: *Oct. 4, 2022

(54) PORTABLE TERMINAL DEVICE

(71) Applicant: MAXELL, LTD., Kyoto (JP)

(72) Inventors: Motoyuki Suzuki, Ibaraki (JP); Kazuhiko Yoshizawa, Ibaraki (JP)

(73) Assignee: Maxell, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,288

(22) Filed: Jul. 2, 2020

(65) Prior Publication Data

US 2020/0334368 A1    Oct. 22, 2020

Related U.S. Application Data

(63) Continuation of application No. 15/104,699, filed as application No. PCT/JP2014/052290 on Jan. 31, 2014, now Pat. No. 10,726,159.

(51) Int. Cl.
*G06F 7/04* (2006.01)
*G06F 12/00* (2006.01)
(Continued)

(52) U.S. Cl.
CPC ............ *G06F 21/629* (2013.01); *G06F 21/45* (2013.01); *H04M 1/72463* (2021.01); *H04W 4/021* (2013.01); *H04W 4/50* (2018.02); *H04W 12/08* (2013.01); *H04W 12/30* (2021.01); *G06F 2221/2111* (2013.01); *H04M 1/72457* (2021.01); *H04W 12/63* (2021.01)

(58) Field of Classification Search
CPC ...... G06F 21/629; G06F 21/45; H04W 12/08; H04W 4/001; H04W 4/021; H04M 1/72577

USPC .......................................................... 726/18
See application file for complete search history.

(56) References Cited

U.S. PATENT DOCUMENTS

2011/0092185 A1    4/2011    Garskof
2011/0247064 A1   10/2011    Kim
(Continued)

FOREIGN PATENT DOCUMENTS

CN          102215285 A    10/2011
CN          102460359 A     5/2012
(Continued)

OTHER PUBLICATIONS

International Search Report of PCT/JP2014/052290 dated Apr. 8, 2014.
(Continued)

*Primary Examiner* — Jeffrey C Pwu
*Assistant Examiner* — Samuel Ambaye
(74) *Attorney, Agent, or Firm* — Mattingly & Malur, PC

(57) ABSTRACT

A portable terminal device (1) sets a security level for each application in accordance with position, and stores the level in a memory (102). The security level determines whether each application is displayed or made executable on a display portion (114a) in locked state and unlocked state. A control unit (101) refers to the security level and determines the application displayed on the display portion (114a) in accordance with position information acquired by a position information acquisition unit (GPS reception unit) (104), and makes executable the application selected by the user. Thus, the portable terminal device (1) offers user-friendliness while ensuring security strength.

14 Claims, 19 Drawing Sheets

(51) Int. Cl.
*G06F 12/14* (2006.01)
*G06F 13/00* (2006.01)
*G11C 7/00* (2006.01)
*G06F 21/62* (2013.01)
*H04W 4/50* (2018.01)
*H04W 12/08* (2021.01)
*H04W 4/021* (2018.01)
*H04M 1/72463* (2021.01)
*H04W 12/30* (2021.01)
*G06F 21/45* (2013.01)
*H04M 1/72457* (2021.01)
*H04W 12/63* (2021.01)

(56) References Cited

U.S. PATENT DOCUMENTS

| | | |
|---|---|---|
| 2012/0102549 A1 | 4/2012 | Mazzaferri et al. |
| 2012/0137369 A1 | 5/2012 | Shin |
| 2013/0067376 A1 | 3/2013 | Kim et al. |
| 2014/0181964 A1 | 6/2014 | Park |

FOREIGN PATENT DOCUMENTS

| | | |
|---|---|---|
| CN | 102830932 A | 12/2012 |
| CN | 103348353 A | 10/2013 |
| JP | 2004-118456 A | 4/2004 |
| JP | 2006-85251 W | 3/2006 |
| JP | 2013-61943 W | 4/2013 |
| JP | 2013-074499 A | 4/2013 |
| JP | 2013-134710 W | 7/2013 |
| WO | 2008/050512 A1 | 5/2008 |
| WO | 2010/136854 A1 | 12/2010 |
| WO | 2013/096949 A1 | 6/2013 |

OTHER PUBLICATIONS

Japanese Office Action received in corresponding Japanese Application No. 2015-559698 dated Feb. 8, 2017.
Japanese Reexamination Report received in corresponding Japanese Application No. 2015-559698 dated Oct. 20, 2017.
Chinese Office Action received in corresponding Chinese Application No. 201480068459.3 dated Mar. 19, 2018.
Chinese Office Action received in corresponding Chinese Application No. 201480068459.3 dated Aug. 2, 2019.

FIG. 2

| APPLICATION / POSITION | EMAIL | SETTING | SEARCH | Works | REMOTE CONTROLLER | CAMERA | Map | GAME |
|---|---|---|---|---|---|---|---|---|
| HOME | H | H | L | H | L | L | L | L |
| WORKPLACE | H | H | L | L | H | H | L | H |
| UNREGISTERED | H | H | L | H | H | L | L | H |

H : SECURITY LEVEL = HIGH (ICON IS NOT DISPLAYED IN LOCKED STATE)
L : SECURITY LEVEL = LOW (ICON IS DISPLAYED IN LOCKED STATE)

FIG. 3(a)
HOME (LOCKED STATE)
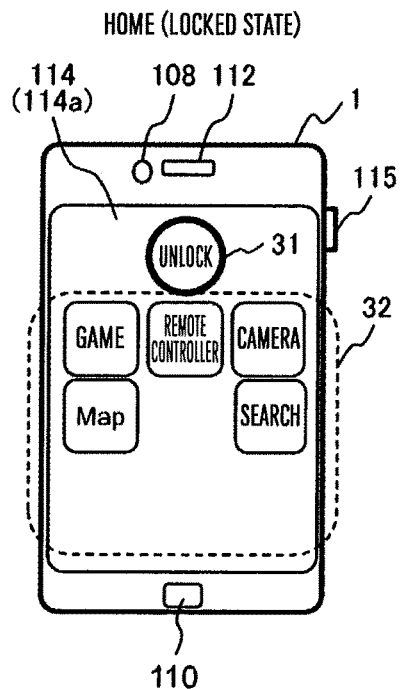
FIG. 3(b)
WORKPLACE (LOCKED STATE)
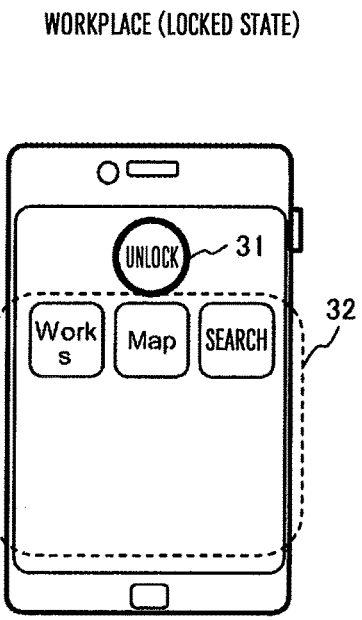
FIG. 3(c)
UNREGISTERED POSITION (LOCKED STATE)
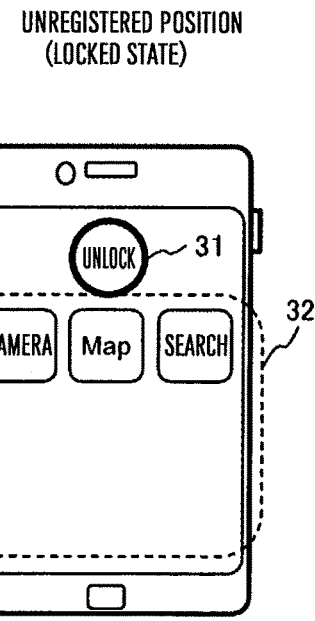
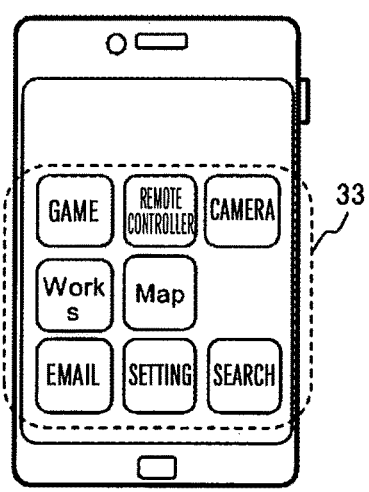
UNLOCK
FIG. 3(d)

FIG. 5

| APPLICATION / POSITION | EMAIL | SETTING | SEARCH | Works | REMOTE CONTROLLER | CAMERA | Map | TRANSIT | GAME |
|---|---|---|---|---|---|---|---|---|---|
| HOME | H | H | L | X | L | L | L | X | L |
| WORKPLACE | H | H | L | L | X | X | L | X | X |
| TRAIN STATION | H | H | L | X | X | X | L | L | L |
| UNREGISTERED | H | H | L | H | H | L | L | H | H |

H : SECURITY LEVEL = HIGH (ICON IS NOT DISPLAYED IN LOCKED STATE)
L : SECURITY LEVEL = LOW (ICON IS DISPLAYED IN LOCKED STATE)
X : USAGE RESTRICTION OF APPLICATION (ICON IS NOT DISPLAYED)

FIG. 6(a) HOME
FIG. 6(b) WORKPLACE
FIG. 6(c) TRAIN STATION
Fig. 6(d) UNREGISTERED POSITON
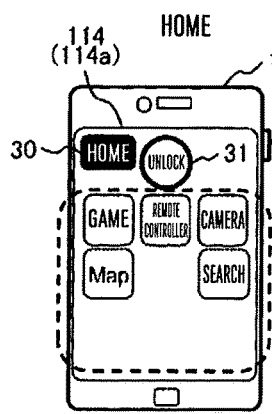
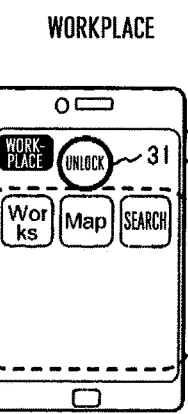
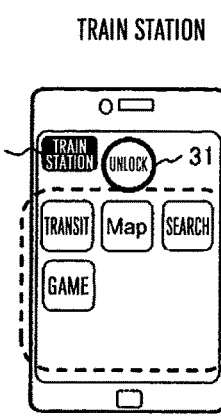
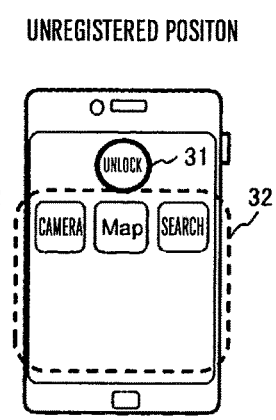
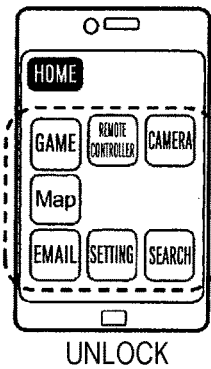
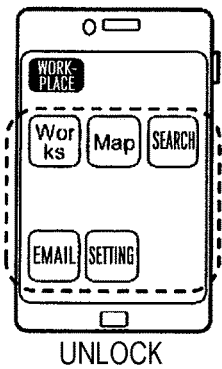
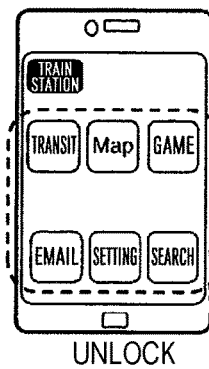
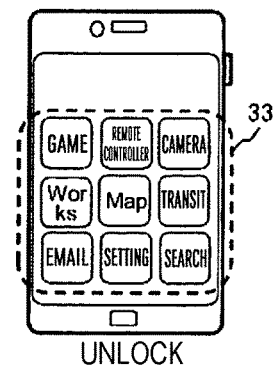
UNLOCK
FIG. 6(e)
UNLOCK
FIG. 6(f)
UNLOCK
FIG. 6(g)
UNLOCK
Fig. 6(h)

FIG. 8

| POSITION | TIME | APPLICATION | EMAIL | SETTING | SEARCH | ALGEBRA | JAPANESE | SCIENCE | Works |
|---|---|---|---|---|---|---|---|---|---|
| SCHOOL | 9 O'CLOCK TO 10 O'CLOCK | | X | X | H | L | H | H | H |
| | 10 O'CLOCK TO 11 O'CLOCK | | X | X | H | H | L | H | H |
| | 11 O'CLOCK TO 12 O'CLOCK | | X | X | L | L | H | L | H |
| | UNSPECIFIED | | H | H | H | H | L | L | H |
| UNREGISTERED | UNSPECIFIED | | H | H | H | H | H | H | H |

FIG. 9(a)  FIG. 9(b)  FIG. 9(c)  FIG. 9(d)
SCHOOL: 9 O'CLOCK TO 10 O'CLOCK   SCHOOL: 10 O'CLOCK TO 11 O'CLOCK   SCHOOL: UNSPECIFIED TIME   UNREGISTERED POSITION
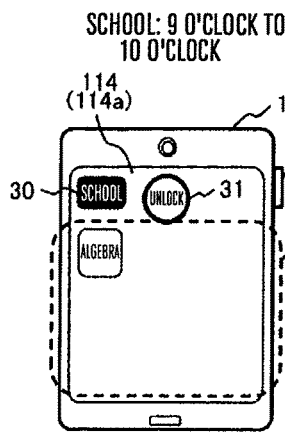 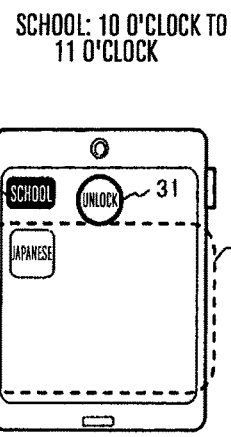 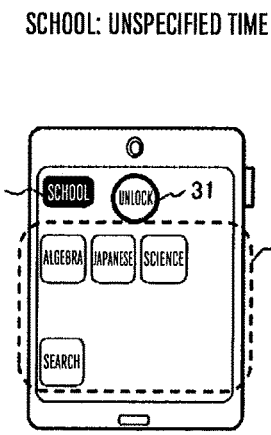 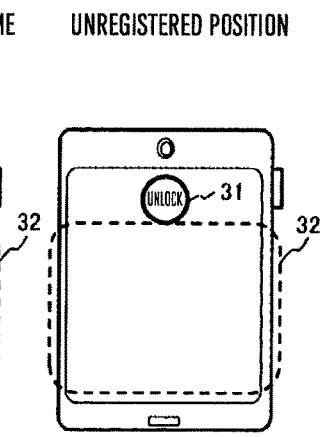
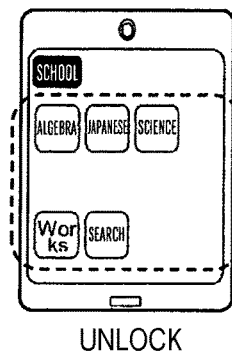 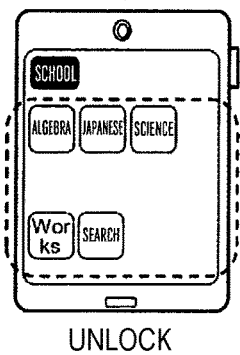 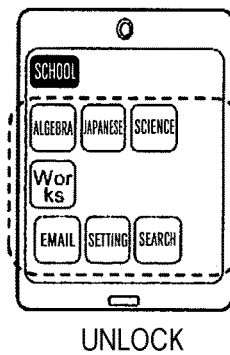 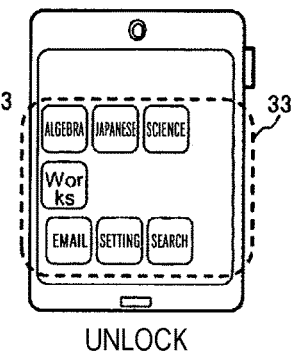
UNLOCK  UNLOCK  UNLOCK  UNLOCK
FIG. 9(e)  FIG. 9(f)  FIG. 9(g)  Fig. 9(h)

FIG. 11

| USER | APPLICATION / POSITION | EMAIL | SETTING | SEARCH | Works | REMOTE CONTROLLER | ENGLISH | ALGEBRA | GAME |
|---|---|---|---|---|---|---|---|---|---|
| USR1 | HOME | X | X | L | X | L | L | L | L |
| USR1 | UNREGISTERED | X | X | L | X | X | L | L | L |
| USR2 | HOME | H | H | L | X | L | X | X | L |
| USR2 | WORKPLACE | H | H | L | L | X | X | X | X |
| USR2 | UNREGISTERED | H | H | H | H | H | H | H | L |
| UNREGISTERED | UNREGISTERED | H | H | H | H | H | H | H | H |

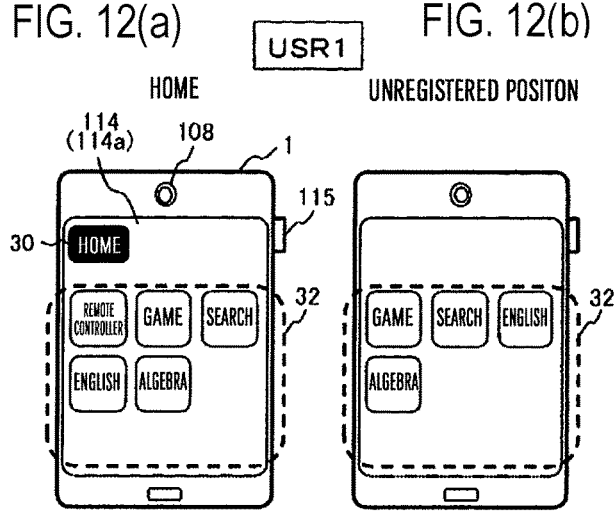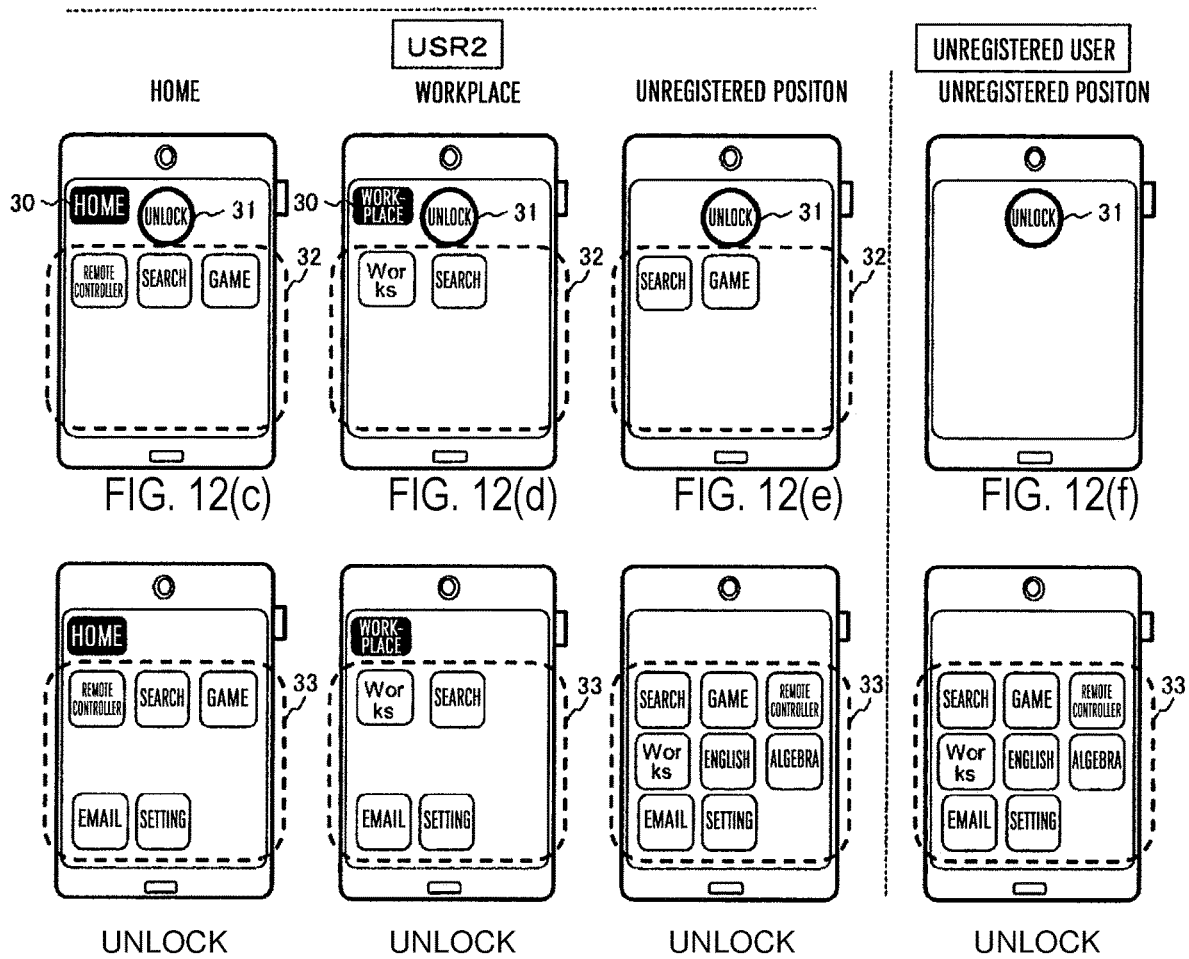

FIG. 14

| APPLICATION / POSITION | EMAIL | SETTING | SEARCH | Works | REMOTE CONTROLLER | CAMERA | Map | TRANSIT | GAME |
|---|---|---|---|---|---|---|---|---|---|
| HOME | H | H | L | X | L | L | L | X | L |
| WORKPLACE | H | H | L | L | X | X | L | X | X |
| TRAIN STATION | M | M | L | X | X | X | L | L | L |
| UNREGISTERED | H | H | L | H | L | L | L | H | H |

H : ICON IS NOT DISPLAYED IN LOCKED STATE, AUTHENTICATION METHOD A
M : ICON IS DISPLAYED IN LOCKED STATE, AUTHENTICATION METHOD B

FIG. 15(a) HOME
FIG. 15(b) WORKPLACE
FIG. 15(c) TRAIN STATION
FIG. 15(d) UNREGISTERED POSITON
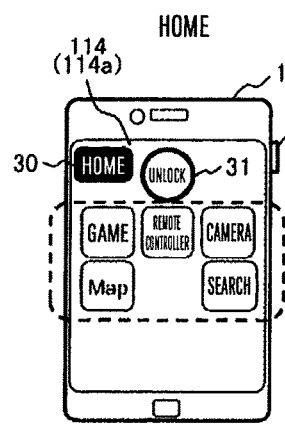
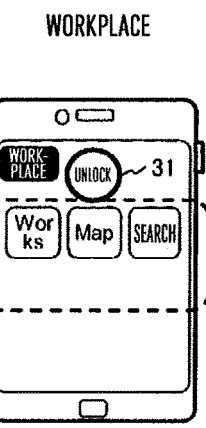
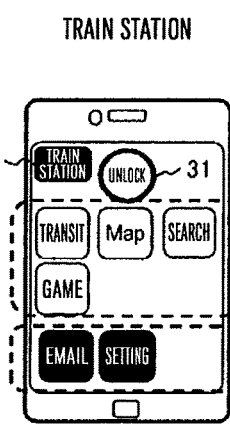
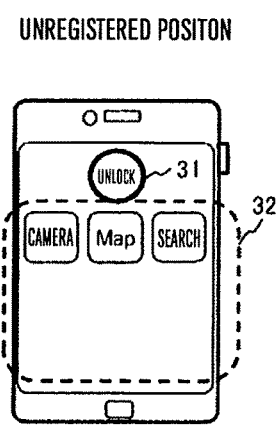
UNLOCK
UNLOCK
UNLOCK
UNLOCK
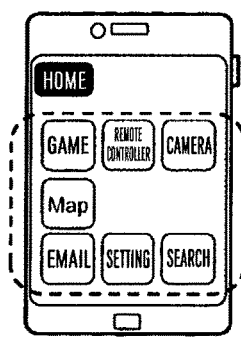
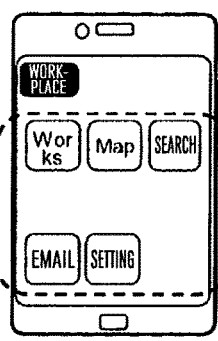
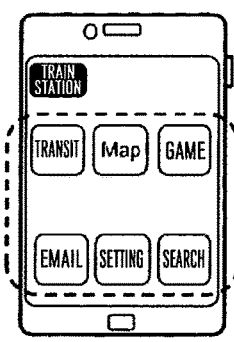
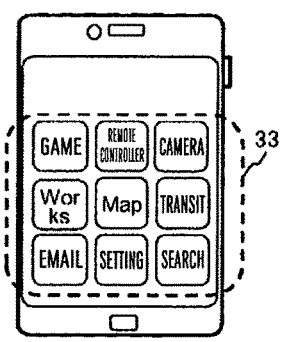
(AUTHENTICATION A)
(AUTHENTICATION B)
FIG. 15(e)
FIG. 15(f)
FIG. 15(g)
FIG. 15(h)

FIG. 17

| APPLICATION / POSITION | EMAIL | SETTING | SEARCH | Works | REMOTE CONTROLLER | CAMERA | Map | TRANSIT | GAME | UNLOCK |
|---|---|---|---|---|---|---|---|---|---|---|
| HOME | H | H | L | X | L | L | L | X | L | AUTHENTICATION A |
| WORKPLACE | H | H | L | L | X | X | L | X | X | AUTHENTICATION A |
| TRAIN STATION | H | H | L | X | L | L | L | L | L | AUTHENTICATION B |
| UNREGISTERED | H | H | L | H | L | L | L | H | H | AUTHENTICATION A |

| FIG. 18(a) | FIG. 18(b) | FIG. 18(c) | FIG. 18(d) |
|---|---|---|---|
| HOME | WORKPLACE | TRAIN STATION | UNREGISTERED POSITON |
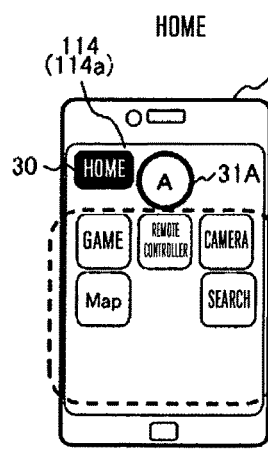 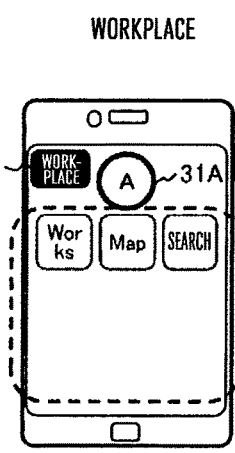 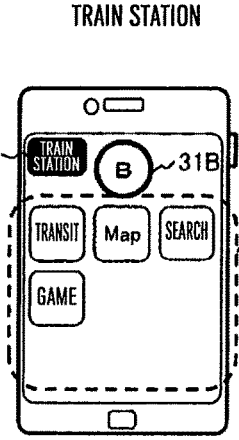 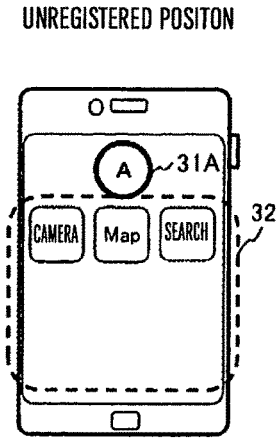
| UNLOCK | UNLOCK | UNLOCK | UNLOCK |
|---|---|---|---|
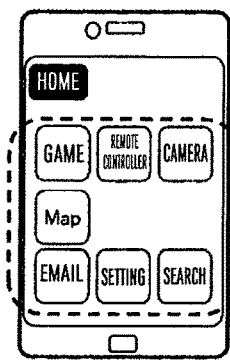 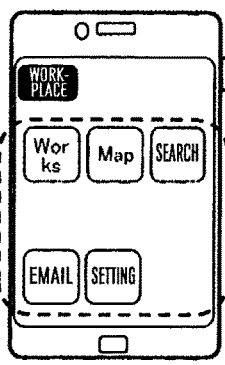 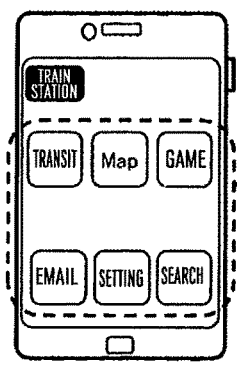 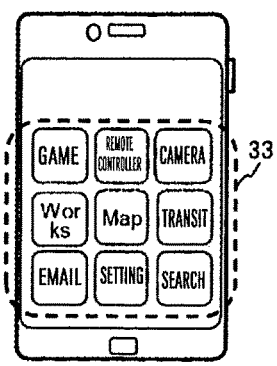
| (AUTHENTICATION A) | (AUTHENTICATION A) | (AUTHENTICATION B) | (AUTHENTICATION A) |
|---|---|---|---|
| FIG. 18(e) | FIG. 18(f) | FIG. 18(g) | FIG. 18(h) |

PORTABLE TERMINAL DEVICE

TECHNICAL FIELD

The present invention relates to a portable terminal device taking security into consideration.

BACKGROUND ART

In recent years, a portable terminal device provided with a touch panel, such as a smartphone or a tablet-type personal computer, is widely prevalent. In order to prevent any third party from illicitly manipulating the portable terminal device, the portable terminal device uses a password authentication in general. In a password authentication, the security strength is enhanced by increasing the length of the character string that is input and by making the character string more complicated. However, when the password is long and complicated, it is necessary for the user to type the keys many times when the user inputs the password, which is reduces the usability for the user himself/herself.

With regard to this issue, Patent Literature 1 indicates that, in order to maintain the balance between the user's usability and the security strength, location information about the portable terminal is obtained with a GPS (Global Positioning System) function provided with the portable terminal device, and the user is authenticated by using a short password when the user is at a location where the user is more likely to be located (e.g., home or workplace), and the user is authenticated by using a long password when the user is at a location where the user is less likely to be located (e.g., places visited in business trip or travel).

Patent Literature 2 indicates that, in order to appropriately arrange, on a terminal screen, an icon of an application corresponding to the location of a terminal, an icon of an application related to a current location is displayed on an upper half portion of the screen, and the icons of the other usual applications are displayed on a lower half portion of the screen.

CITATION LIST

Patent Literature

PATENT LITERATURE 1: JP-A-2004-118456
PATENT LITERATURE 2: JP-A-2013-74499

SUMMARY OF INVENTION

Technical Problem

According to the technique of Patent Literature 1, the length of the password is shortened or the password is unnecessary at home or the workplace of the user. Therefore, the portable terminal device of the user may be easily operated by a family member or a colleague. Therefore, for example, a security problem remains, i.e., even information that is needed to be secret to a family member or a colleague, such as contents of private emails of the user, may be seen.

According to the technique of Patent Literature 2, an application can be selected smoothly in accordance with the location of the portable terminal device, but the security of the user himself/herself is not taken into consideration.

It is an object of the present invention to provide a portable terminal device providing a high operability for the user while the security strength is ensured.

Solution to Problem

The present invention is a portable terminal device executing an application in accordance with a selection made by a user, the portable terminal device including: a location information obtaining unit obtaining location information about the portable terminal device; a security level setting storage unit setting and storing a security level for each application in accordance with a location; a display unit displaying an application that can be selected by the user; and a control unit controlling a display of the display unit, and executing the application selected by the user. Herein, the security level is defined to display each application on the display unit or allow execution of the application in a locked state and an unlocked state of the portable terminal device, and the control unit refers to the security level stored in the security level setting storage unit to determine an application displayed on the display unit in accordance with the location information obtained by the location information obtaining unit, and causes the application selected by the user to be executed.

Advantageous Effects of Invention

The present invention can provide a portable terminal device providing a high operability for the user while the security strength is ensured.

BRIEF DESCRIPTION OF DRAWINGS

FIG. 2 is a figure illustrating an example in which a security level is set for each application in accordance with the location.

FIGS. 3(a) to 3(d) are figures illustrating examples of displays of home screens in the setting of FIG. 2.

FIG. 5 is a figure illustrating an example in which a security level is set for each application in a second embodiment.

FIGS. 6(a) to 6(h) are figures illustrating examples of displays of home screens in the setting of FIG. 5.

FIG. 8 is a figure illustrating an example in which a security level is set for each application in a third embodiment.

FIGS. 9(a) to 9(h) are figures illustrating examples of displays of home screens in the setting of FIG. 8.

FIG. 11 is a figure illustrating an example in which a security level is set for each application in a fourth embodiment.

FIGS. 12(a) to 12(j) are figures illustrating examples of displays of home screens in the setting of FIG. 11.

FIG. 14 is a figure illustrating an example in which a security level is set for each application in a fifth embodiment.

FIGS. 15(a) to 15(h) are figures illustrating examples of displays of home screens in the setting of FIG. 14.

FIG. 17 is a figure illustrating an example in which a security level is set for each application in a sixth embodiment.

FIGS. 18(a) to 18(h) are figures illustrating examples of displays of home screens in the setting of FIG. 17.

DESCRIPTION OF EMBODIMENTS

Hereinafter, embodiments of the present invention will be explained with reference to drawings.

First Embodiment

Figure 1:
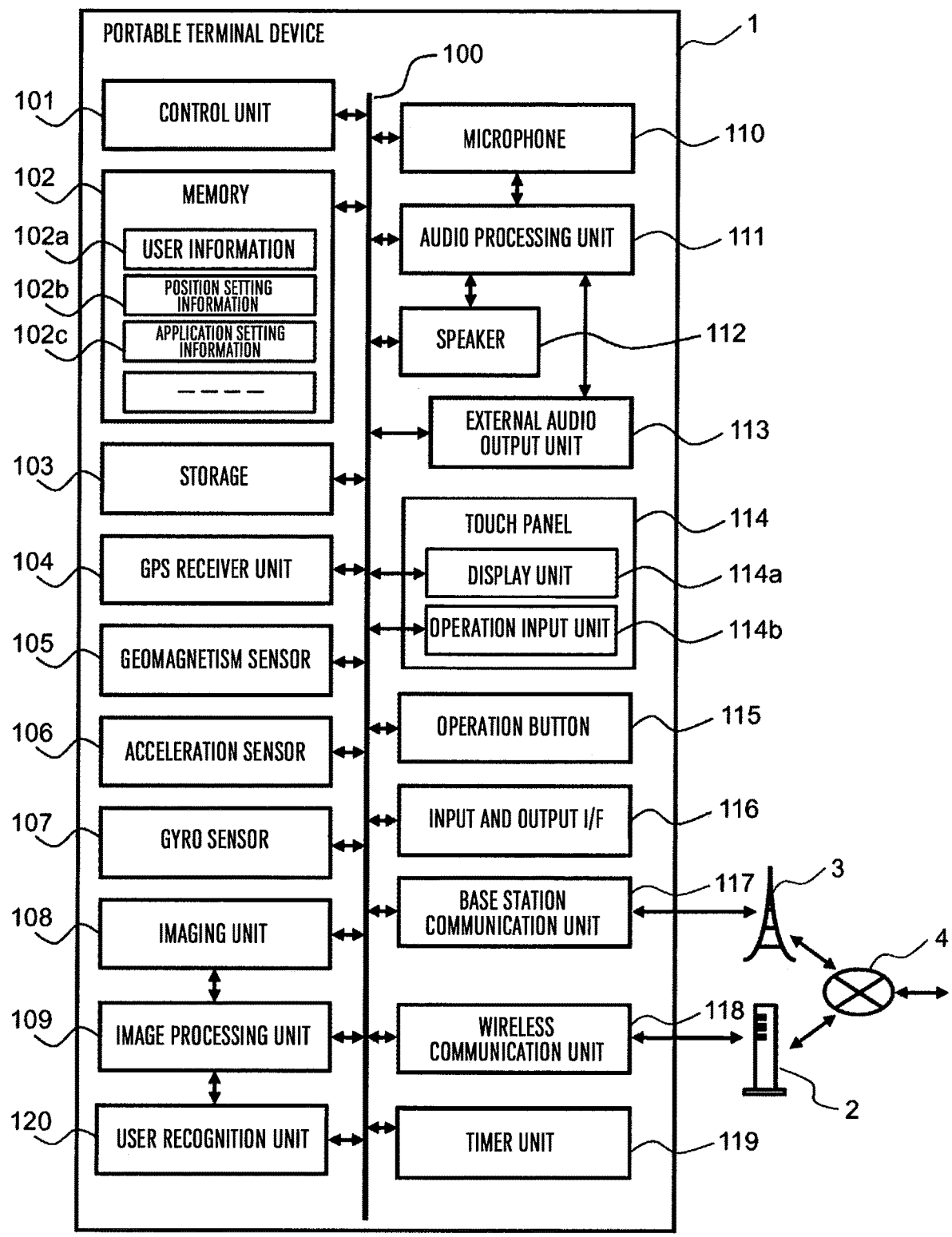
FIG. 1 is a block diagram illustrating an internal configuration of portable terminal device 1 according to a first embodiment.

FIG. 1 is a block diagram illustrating an internal configuration of portable terminal device 1 according to a first embodiment. In this case, for example, a case of a smartphone will be explained. Portable terminal device 1 is constituted by using, as necessary, control unit 101, memory 102, storage 103, global positioning system (GPS) receiver unit 104, geomagnetism sensor 105, acceleration sensor 106, gyro sensor 107, imaging unit 108, image processing unit 109, microphone 110, audio processing unit 111, speaker 112, external audio output unit 113, touch panel 114, operation button 115, input and output I/F 116, base station communication unit 117, wireless communication unit 118, timer unit 119, user recognition unit 120, and these constituting units are connected with each other via bus 100.

Control unit 101 is constituted by a central processing unit (CPU) or the like to control the constituting units and execute various kinds of processing by executing a program stored in memory 102.

Memory 102 is a flash memory or the like, and stores programs and data used by control unit 101. Memory 102 includes user information 102a of, e.g., a password, face information, a telephone number, or the like for user authentication, information (location setting information) 102b about a location where the user often uses the portable terminal device such as home or a workplace and information about a security level that is set for each application (application setting information) 102c or the like in association with the location. Further, portable terminal device 1 includes storage 103 such as a memory card to save data of music, video, and pictures.

GPS receiver unit 104 receives signals from GPS satellites in the sky. Accordingly, the current location of portable terminal device 1 is detected. Geomagnetism sensor 105 detects the direction in which portable terminal device 1 is oriented. Acceleration sensor 106 detects the acceleration of portable terminal device 1, and gyro sensor 107 detects the angular speed of portable terminal device 1. With these sensors, the inclination and the motion of portable terminal device 1 can be detected in details.

Imaging unit 108 is a camera or the like, and image processing unit 109 processes a video that is input from imaging unit 108. Image processing unit 109 processes a video displayed on display unit 114a of touch panel 114.

Microphone 110 inputs external audio, and speaker 112 outputs audio to the outside. External audio output unit 113 is connected to, for example, an earphone (not shown), and outputs audio. Audio processing unit 111 processes audio that is input and output.

Touch panel 114 is constituted by display unit 114a and operation input unit 114b. Display unit 114a is a unit such as an LCD that displays video and an image, and has operation input unit 114b on a display surface of display unit 114a. Operation input unit 114b is input means such as a capacitance type using a touch pad method, and is configured to detect, as an operation input, a contact operation performed with a finger, a touch pen, or the like. For example, an icon or a menu of an application is displayed on display unit 114a. When the user performs an operation for pressing a desired icon or menu with a fingertip for a single time (tap operation), an application corresponding to the icon displayed at the tapped position is executed, or the processing associated with the menu is executed. When the user performs an operation for pressing operation input unit 114b with the fingertip and sliding the fingertip in the right or left direction (swipe operation) while the home screen is displayed, processing for switching the home screen is performed.

Operation button 115 is a push button switch or the like, and when it is detected that operation button 115 is pressed, this detection is transmitted to control unit 101, and an operation corresponding to operation button 115 is executed.

Input and output I/F 116 is, for example, a USB (Universal Serial Bus) or the like, and is an interface for transmitting and receiving data to and from an external device.

Base station communication unit 117 is a communication interface of, e.g., W-CDMA (Wideband Code Division Multiple Access) or LTE (Long Term Evolution) for performing long-range wireless communication with base station 3. Wireless communication unit 118 is a communication interface that performs wireless communication with wireless communication access point 2 using wireless LAN such as IEEE802.11a/b/n. Accordingly, a connection with external network 4 is made via base station 3 or access point 2, so that information is transmitted and received. Each of base station communication unit 117 and wireless communication unit 118 is constituted by an antenna, a modulating circuit, a demodulating circuit, or the like.

Timer unit 119 uses, for example, a real time clock (RTC) circuit to output current time information, and connects to a network time protocol (NTP) server via base station communication unit 117 or wireless communication unit 118 to automatically correct the time.

User recognition unit 120 recognizes the user by comparing an image of the user retrieved from imaging unit 108 and processed by image processing unit 109 and face information stored in memory 102 as user information 102a.

The program or the data stored in memory 102 or storage 103 may be updated or added as necessary by connecting to external network 4 via base station 3 or the access point 2 using base station communication unit 117 or wireless communication unit 118 and downloading program or data from a not-shown external server or the like. Alternatively, the data, the program, or the like may be updated and added by connecting to an external device such as a personal computer via input and output I/F 116.

It should be noted that a tablet-type personal computer has substantially the same configuration as the smartphone as illustrated in FIG. 1, and the explanation thereabout is omitted.

In the present embodiment, a security level is set for each application in accordance with the location of portable terminal device 1 as location setting information 102b and application setting information 102c in memory 102. The present embodiment is characterized in that an application of which security level is low can be executed quickly without performing authentication processing, and an application of which security level is high can be executed after predetermined authentication processing is performed.

FIG. 2 is a figure illustrating an example in which a security level is set for each application in accordance with a location. In this example, "home" and "workplace" are registered as the locations (the locations other than these are "unregistered"). In accordance with the location, the security levels of applications such as "email", "setting", or the like are set. These setting informations are stored as location setting information 102b and application setting information 102c in memory 102.

The security level "H" denotes an application of which security strength is high and which causes problems when the application is executed by other people. In this case, the application cannot be executed unless the home screen is unlocked. More specifically, on the home screen in the locked state, icons corresponding to the applications are not displayed, and when the home screen is unlocked, the icons are displayed.

The security level "L" denotes an application of which security strength is low and which does not cause problems when the application is executed by other people. In this case, the application can be executed even in the locked state. More specifically, even on the home screen in the locked state, icons corresponding to the applications are displayed.

In this case, the location is registered by the user himself/herself in accordance with the usage environment of the user, but a location where the frequency of execution is high may be automatically registered from the history of locations where the applications are executed. The security level of each application may be set by the user himself/herself in accordance with the usage environment of the user, but a default setting may be made as an initial value of each application, and thereafter, the user may change settings in accordance with the usage environment of the user.

Although an input screen for setting the above security level is not particularly indicated, it may be incorporated into a part of an initial setting function of a conventional portable terminal device, and the user may make settings (or change settings) while map information (including the size of the setting area) and a list of applications are displayed on the screen.

FIGS. 3(a) to 3(d) are figures illustrating examples of displays of home screens in a setting of FIG. 2. FIGS. 3(a) to 3(c) illustrate a locked state, and FIG. 3(d) illustrates an unlocked state. In this case, touch panel 114 of portable terminal device 1 as well as imaging unit 108, speaker 112, operation button 115, and microphone 110 are shown.

FIG. 3(a) is a home screen in a locked state at home, which displays unlock icon 31 and icon group 32 of an application that can be executed even in a locked state. This screen is also referred to as a "lock screen". In this example, icons of applications of "game", "remote controller", "camera", "Map", "search" of which security levels are set to "L" at home are displayed, and the applications can be executed without inputting authentication information for unlocking.

FIG. 3(b) is a home screen in a locked state at a workplace, which displays icons of "Works", "Map", "search" of which security levels are set to "L" at the workplace are displayed as icon group 32, and the they can be executed without unlocking.

FIG. 3(c) is a home screen in a locked state at a not-registered location other than the home and the workplace, which displays icons of applications of "camera" and "search" of which security levels are set to "L" are displayed as icon group 32, and the applications can be executed without unlocking.

FIG. 3(d) is a home screen in an unlocked state obtained by selecting icon 31 and inputting authentication information, and displays icon group 33 of applications that can be executed after unlocking. In icon group 33, the icons of applications which were not displayed on the lock screens shown in FIGS. 3(a) to 3(c) and of which security levels are set to "H" are additionally displayed, and can be executed.

Figure 4:
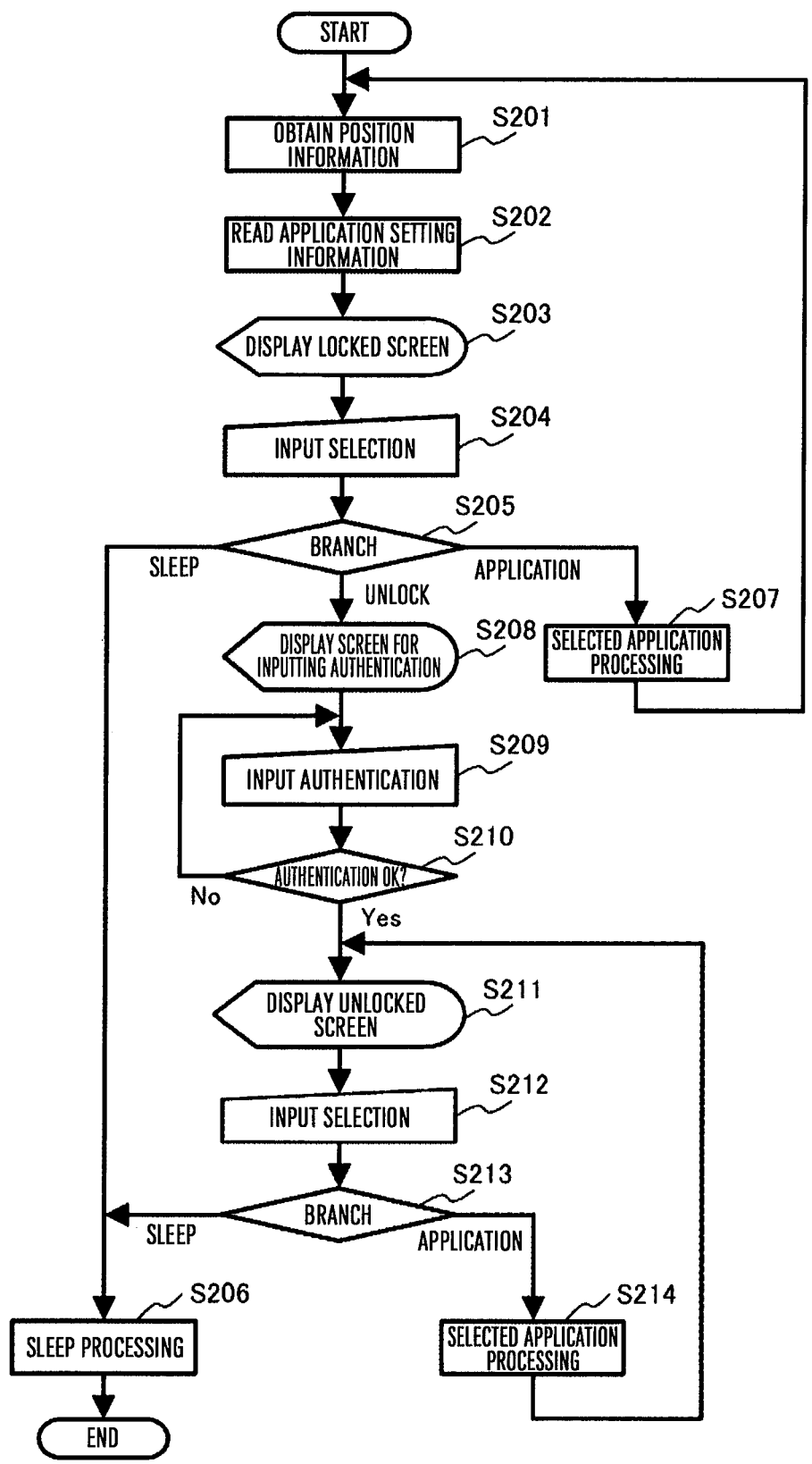
FIG. 4 is a flowchart illustrating an operation of portable terminal device 1 according to the first embodiment.

FIG. 4 is a flowchart illustrating an operation of portable terminal device 1 according to the first embodiment. In this case, an operation for unlocking sleep state and selecting a desired application will be explained. The sleep state is unlocked by pressing, for example, operation button 115, and the series of operations is controlled by control unit 101.

In S201, the current location information about portable terminal device 1 is obtained. In order to obtain the current location information, for example, the location information received by GPS receiver unit 104 is used.

In S202, a determination is made as to whether the obtained current location information is within a range of the location of the home, the workplace, or the like registered in advance by referring to location setting information 102b and application setting information 102c in memory 102. Then, an icon of an application of which the security level is set to "L", i.e., an application that can be executed without unlocking is read out in accordance with the classification of the determined current location.

In S203, icon group 32 of the application that can be executed without unlocking obtained in S202 and unlock icon 31 are displayed as a lock screen on display unit 114a of touch panel 114.

In S204, the user uses operation input unit 114b to select an icon or a menu displayed on display unit 114a, or gives an input by pressing operation button 115. In S205, the following branch processing is performed in accordance with a selection input given by the user in S204.

In a case where operation button 115 is pressed in the input of S204, the flow is branched to "sleep" and goes to S206. In S206, in order to reduce the power consumption, for example, the display of display unit 114a on touch panel 114 is erased, and the processing proceeds to a sleep state, and the processing is terminated.

In the input of S204, in a case where the icon of the application displayed on display unit 114a is selected by a tap operation performed by the user, the flow is branched to "application", and goes to S207. In S207, the processing of the application corresponding to the selected icon is executed, and thereafter, return to the processing in S201.

In a case where unlock icon 31 displayed on display unit 114a is selected by a tap operation performed by the user in the input of S204, the flow is branched to "unlock" and goes to S208. In S208, a screen for inputting authentication information for unlocking is displayed.

In S209, the user uses operation input unit 114b to input the authentication information, and in S210, a determination is made as to whether the input information is valid or not by collating the information with the authentication information registered in user information 102a. In a case where the information is determined not to be valid (No), the flow is returned back to S209, and the authentication information is input again.

In a case where the information is determined to be valid in S210 (Yes), the flow goes to S211, an unlocked home screen is displayed. On the unlock screen, an icons of applications of which security level are set to "H" for the current location are added, and icon group 33 of executable applications is displayed.

In S212, the user uses operation input unit 114b to select an icon or a menu displayed on display unit 114a, or gives an input by pressing operation button 115 (sleep selection). In S213, branch processing is performed in accordance with a selection input given by the user in S212.

In a case where operation button 115 is selected for the input in S212, the flow is branched to "sleep" and goes to S206, and the sleep processing is performed, and then this flow is terminated.

In a case where the icon of the application displayed on display unit 114a is selected by a tap operation performed by the user for the input in S212, the flow is branched to "application", and goes to S214. In S214, after the processing of the application corresponding to the selected icon is executed, the flow is returned to the processing in S211, and a subsequent selection of the user is waited for.

As described above, in the first embodiment, a security level is set for each application in accordance with the location. More specifically, an application of which security level is set to be low can be executed quickly without performing the authentication processing even in the locked state. On the other hand, an application of which security level is set to be high can be executed after the authentication processing is performed to unlock the lock.

For example, an application of "remote controller" for operating as a remote controller for a television set can be executed without being unlocked at home, and an application of "transit" supporting a passenger to change trains can be executed without being unlocked at a train station, so that the usability can be improved. On the other hand, in order to execute an application that may cause a problem when it is seen by other people such as "email", it is necessary to unlock the home screen by performing the authentication, so that the security can be ensured. More specifically, it is difficult for a person other than the user to unlock the home screen by performing the authentication, so that the security for such application can be ensured.

Second Embodiment

A second embodiment includes not only the functions of the first embodiment but also a function for limiting the use of a particular application at a particular location. More specifically, the home screen that is displayed is changed for each location.

FIG. 5 is a figure illustrating an example in which a security level is set for each application in accordance with a location. In this example, "home", "workplace", "train station" are registered as the locations. Like the first embodiment (FIG. 2), the security level "H" is a high security strength, and therefore, it cannot be executed without being unlocked. The security level "L" is a low security strength, and therefore, it can be executed even in the locked state. Further, in the present embodiment, a security level "X" for limiting the use of the application is provided. An icon corresponding to an application that is set to the security level "X" is not displayed on the home screen even in the locked state and in the unlocked state, so that the use of the application is limited. For example, at "home", the application "Works" is set to the security level "X", and the icon is not displayed on the home screen at "home", so that the use is limited.

FIGS. 6(a) to 6(h) are figures illustrating examples of displays of home screens in the setting of FIG. 5. FIGS. 6(a) to 6(d) illustrate the locked state. FIGS. 6(e) to 6(h) illustrate the unlocked state. In this example, in addition to the first embodiment (FIG. 2), FIGS. 6(c) and 6(g) are added in a case where the location is "train station". On each home screen, information 30 indicating which location the home screen corresponds to is displayed.

For example, FIG. 6(a) is a lock screen at "home", and displays icon group 32 of "game", "remote controller", "camera", "Map", and "search" of which security levels are U. FIG. 6(e) is an unlock screen at "home", and displays icon group 33 additionally including "email", "setting" of which security levels are "H". However, an icon of "Works" that is set to the security level "X" is not displayed in any of the screens of FIGS. 6(a) and 6(e). Therefore, the use of the application "Works" is limited.

On the other hand, FIGS. 6(b) and 6(f) are home screens at "workplace", and in FIGS. 6(b) and 6(f), the icon of "Works" of which security level is "L" is displayed in both of the screens. However, the icons such as "remote controller", "camera", or the like of which security level is set to "X" are not displayed even when the home screen is unlocked. As described above, the home screen in the unlocked state is changed in accordance with the location, so that the use of a particular application is limited in accordance with the location.

When the application of which use is limited is to be executed, this can be executed by changing the home screen. For example, when the user wants to execute an application of "Works" at home, the user unlocks the lock with icon 31 and changes the home screen from FIG. 6(a) to FIG. 6(e), and further, the user changes to the home screen shown in FIG. 6(f) corresponding to the work place, so that the user can execute the application of "Works".

Figure 7:
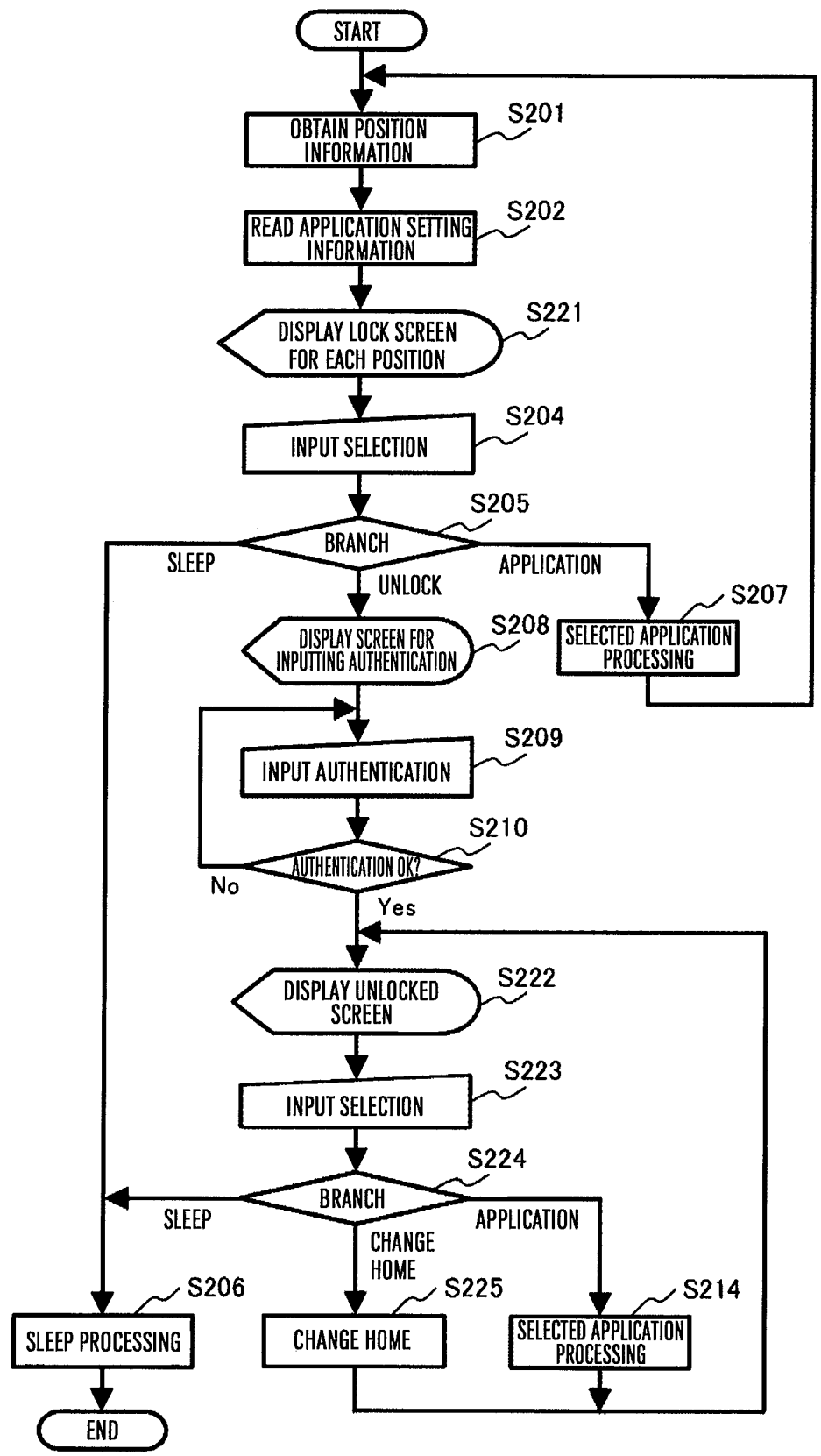
FIG. 7 is a flowchart illustrating an operation according to the second embodiment.

FIG. 7 is a flowchart illustrating an operation according to the second embodiment. In the present embodiment, a usage limitation of an application is added to the first embodiment (FIG. 4). It should be noted that the same steps as those in FIG. 4 will be denoted with the same step numbers, and a repeated portion will be briefly explained.

In S201, current location information about portable terminal device 1 is obtained. In S202, an icon of an application of which the security level is set to "L" is read out in accordance with the classification of the current location by referring to location setting information 102b and application setting information 102c in memory 102.

In S221, icon group 32 of applications of which security levels are "L" obtained in S202 is displayed as the lock screen corresponding to the current location on display unit 114a of touch panel 114. Position information 30 about the home screen is displayed on display unit 114a.

In S204, the user operates touch panel 114 to select a desired operation. In S205, branch processing is performed in accordance with the selection input performed by the user in S204.

When "sleep" is selected in S204, S206 is subsequently performed, and accordingly, portable terminal device 1 goes into the sleep state, and terminates the processing.

In a case where the icon of the application displayed on display unit 114a is selected in S204, S207 is subsequently performed, and after the processing of the selected application is executed, S201 is subsequently performed.

In a case where unlock icon 31 displayed on display unit 114a is selected in S204, S208 is subsequently performed, and a screen for inputting authentication information for unlocking is displayed.

In S209, the user uses operation input unit 114b to input the authentication information, and in S210, a determination is made as to whether the input information is valid as the authentication information registered in advance. In a case where the information is determined not to be valid (No), the flow is returned back to S209, and the authentication information is input again.

In a case where the information is determined to be valid in S210 (Yes), S222 is subsequently performed, and an unlocked home screen that is set for each location is displayed. On the unlocked home screen, icon group 33 of executable applications that are set for each location is displayed. This icon group 33 includes icons of which security levels are "H" but does not include icons of which security levels are "X".

In S223, the user uses operation input unit 114b to select an icon or a menu displayed on display unit 114a. Alternatively, the user performs an input by, e.g., pressing operation button 115 (sleep selection) or performing swipe operation (home screen change). In S224, branch processing is performed in accordance with a selection input given by the user in S223.

In a case where "sleep" is selected in the input of S223, S206 is subsequently performed, and portable terminal device 1 proceeds to the sleep state, and terminates the processing.

In a case where the icon of the application displayed on display unit 114a is selected in S223, S214 is subsequently performed, and the processing of the selected application is executed, and thereafter, S222 is performed again.

In a case where swipe operation performed by the user in the input of S223 is detected, S225 is subsequently performed, and portable terminal device 1 changed to the setting of the home screen corresponding to another location. Then, S222 is performed again, and the home screen corresponding to the changed location is displayed.

In the above example, change of the home screen (a branch based on the swipe operation) in the selection input of S223 is permitted, but this may be prohibited. Accordingly, the use of an application that may cause problems can be prohibited in accordance with the location, for example, an execution of an application "camera" for taking a photo is prohibited at the workplace.

In the second embodiment, a security level is set for each application in accordance with a location, so that, like the first embodiment, the portable terminal device ensuring the security and providing high usability for the user can be provided. Furthermore, in the second embodiment, the function for limiting the use of a particular application in accordance with a location is added, so that the security function is further improved.

Third Embodiment

In a third embodiment, in addition to the functions of the second embodiment, a security level for each application is switched and set in accordance with a time.

FIG. 8 is a figure illustrating an example in which a security level is set for each application in accordance with a location and a time. This setting information is registered to application setting information 102c in memory 102. In this example, "school" is registered as a location, and in a period of time from 9 o'clock to 12 o'clock, a security level is changed and set in accordance with a time table of a class. More specifically, the security levels of applications used for the subject of the class are set to "L", and so that the applications can be executed even in the locked state. The security levels of the other applications are set to "H" or "X", so that unless the home screen is unlocked, the applications cannot be executed, or the use of the applications is limited. For example, in a period of time from 9 o'clock to 10 o'clock, only the application of "algebra" which is the subject of the class is set to level "L". During the time zone of the classes, the applications such as "email", "setting", or the like are set to level "X", so that their usage is limited. In the locations other than "school", the levels of all the applications are set to "H", so that the applications are configured not to be executable unless the home screen is unlocked.

FIGS. 9(a) to 9(h) are figures illustrating examples of displays of home screens in the setting of FIG. 8. FIGS. 9(a) to 9(d) illustrate the locked state, and FIGS. 9(e) to 9(h) illustrate the unlocked state. In this case, a change of a display in each time zone in the school is added.

FIGS. 9(a) and 9(b) are lock screens in the time zone of the classes in the school, and in FIGS. 9(a) and 9(b), icon group 32 of applications such as "algebra", "Japanese", or the like of which security levels are set to "L" is displayed in accordance with the subjects of the classes. In FIG. 9(c), the icons of all the subjects used in the classes are displayed on the lock screen in a time other than the time zone of the classes of the school. FIG. 9(d) is a lock screen at an unregistered location other than the school, and in FIG. 9(d), none of the icons of the applications are displayed, and only unlock icon 31 is displayed.

FIGS. 9(e) and 9(f) are unlock screens in the time zone of the classes in the school, and in FIGS. 9(e) and 9(f), icon group 33 of all the subjects used in the classes is displayed, but "email", "setting" of which security levels are set to "X" are not displayed. FIG. 9(g) is an unlock screen in a time zone other than the time zone of the classes in the school, and displaying icon group 33 of all the applications. FIG. 9(h) is an unlock screen at an unregistered location other than the school. In FIG. 9(h), like FIG. 9(g), icon group 33 of all the applications is displayed.

Figure 10:
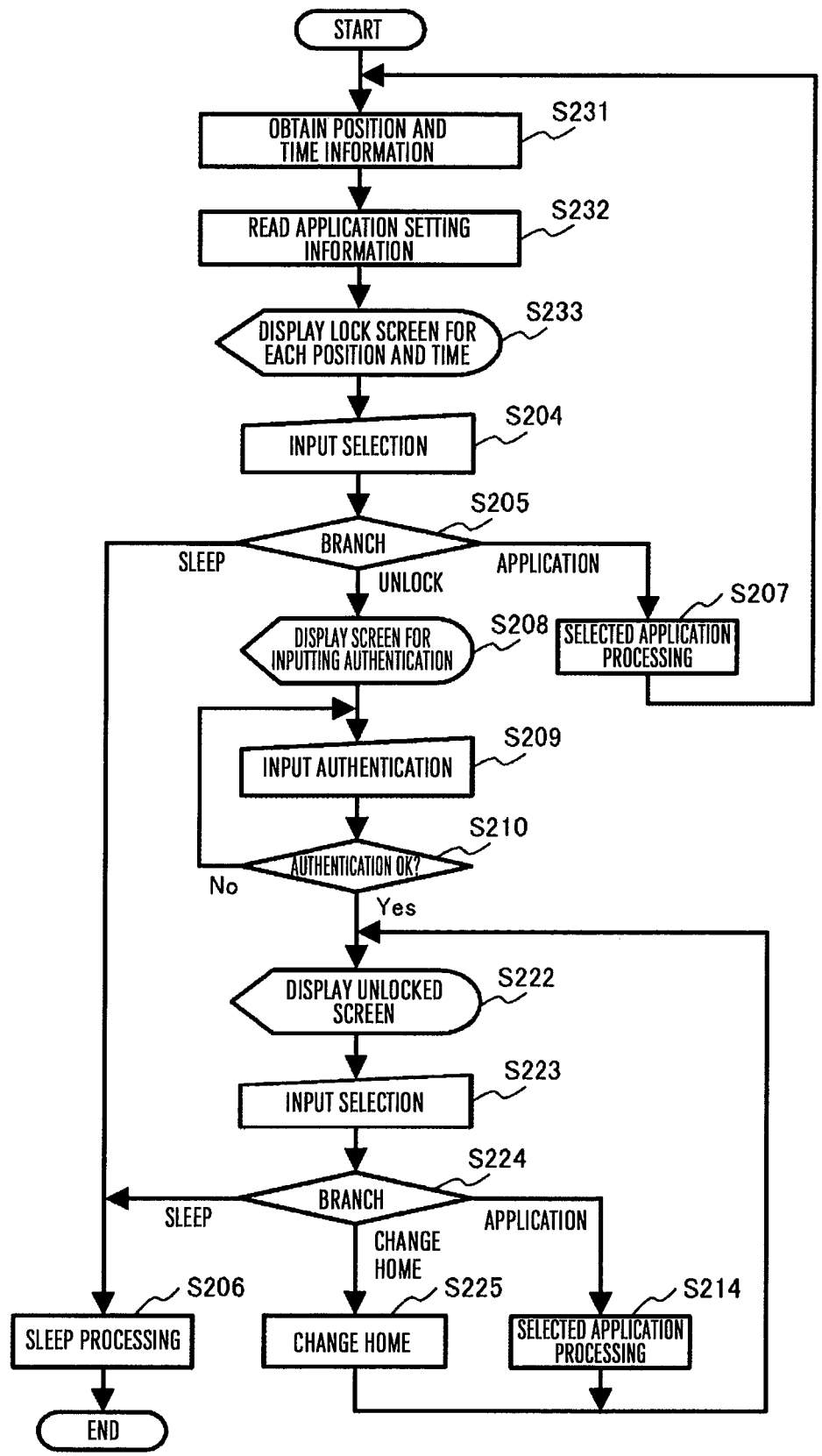
FIG. 10 is a flowchart illustrating an operation according to the third embodiment.

FIG. 10 is a flowchart illustrating an operation according to the third embodiment. In the present embodiment, a control according to time information is added to the second embodiment (FIG. 7). It should be noted that the same steps as those in FIG. 7 will be denoted with the same step numbers, and a repeated portion will be omitted or briefly explained.

In S231, current location information and current time information are obtained by using GPS receiver unit 104 and timer unit 119 of portable terminal device 1.

In S232, an icon of an application of which the security level is set to "L" is read out in accordance with the classification of the current location and the current time by referring to location setting information 102b and application setting information 102c in memory 102.

In S233, icon group 32 of applications of which security levels are "L" obtained in S232 is displayed as the lock screen corresponding to the current location and the current time on display unit 114a of touch panel 114. Position information 30 about the home screen is displayed on display unit 114a.

Step S204 and subsequent steps are the same as those of the second embodiment (FIG. 7). However, in S222, applications that are set to the security level "H" are added for each of the current locations and the current time, and icon group 33 is displayed on display unit 114a.

In the third embodiment, a security level for each application is set in accordance with the location and the time. Therefore, for example, the security level is set in accordance with a time table of classes in the school, so that an application corresponding to a class can be executed quickly without unlocking, and further, an application not related to the class can be prohibited from being used.

In the above explanation, the security level for each application is set in accordance with a combination of the location and the time. Alternatively, the security level for each application can be set in accordance with only "time".

Fourth Embodiment

In a fourth embodiment, in addition to the functions of the second embodiment, the security level of an application is switched and set in accordance with the user.

FIG. 11 is a figure illustrating an example in which a security level is set for each application in accordance with the user and the location. This setting information is registered to application setting information 102c in memory 102. In this example, USR1 and USR2 are registered as the users, and "home" and "workplace" are registered as the locations.

USR1 is assumed to be, for example, a child, and the security levels of "English" and "algebra" used in the classes of the school are set to "L", and "email" and "setting" are set to security level "X" for limiting the usage. The security level "H" that can be executed by unlocking is not set.

USE2 is assumed to be, for example, an employee, and "remote controller" and "game" are set to "L" at home, but "remote controller" and "game" are set to level "X" for limiting the usage at the workplace.

For an unregistered user, the location is also "unregistered", and the security levels of all the applications are set to "H" regardless of the location.

FIGS. 12(a) to 12(j) are figures illustrating examples of displays of home screens in the setting of FIG. 11, and FIGS. 12(a) and 12(b) are home screens for USR1, and FIGS. 12(c) to 12(e), 12(g) to 12(i) are home screens for USR2, and FIGS. 12(f) and 12(j) are home screens for unregistered users.

In FIGS. 12(a) and 12(b), icon group 32 of applications that can be executed without unlocking is displayed on home screen for home and locations other than the home for USR1. The unlock icon is not displayed. Therefore, an application that can be used by USR1 is limited to only icon group 32.

FIGS. 12(c) to 12(e) are lock screens at the home/workplace of USR2 and the locations other than the home/workplace, and in FIGS. 12(c) to 12(e), icon group 32 of applications that can be executed without unlocking at each of the locations is displayed. When the screen is unlocked the home screen is switched to the home screens of FIGS. 12(g) to 12(i), and icon group 33 to which an application of a security level "H" is added is displayed.

FIG. 12(f) home screen shows a locked state for an unregistered user, and in FIG. 12(f), none of the icons of the applications are displayed regardless of the location. When unlocked, the home screen is switched to the screen of FIG. 12(j), and icon group 33 of applications of which security levels are "H" is displayed.

Figure 13:
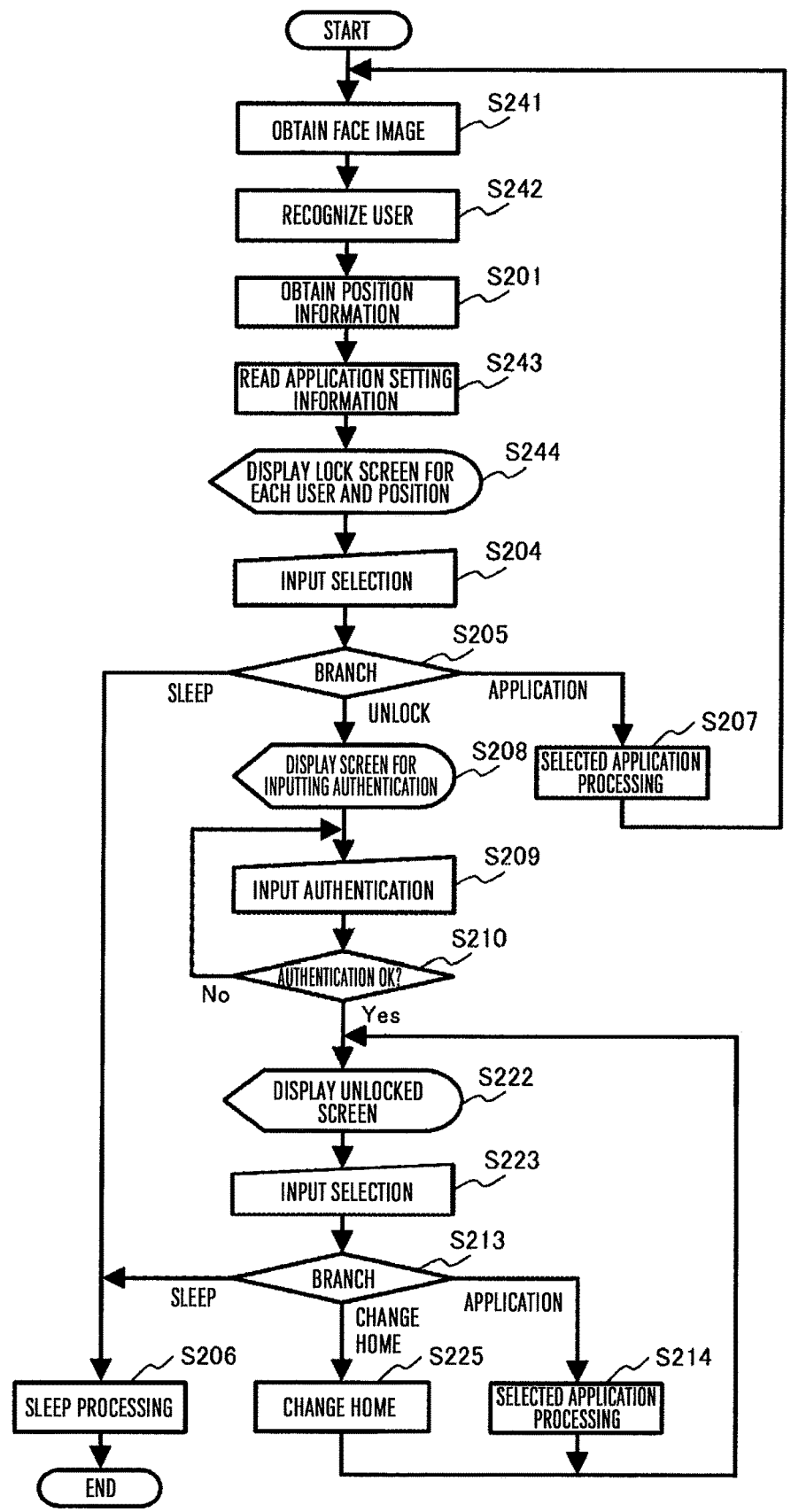
FIG. 13 is a flowchart illustrating an operation according to the fourth embodiment.

FIG. 13 is a flowchart illustrating an operation according to the fourth embodiment. In the present embodiment, a control according to a user is added to the second embodiment (FIG. 7). It should be noted that the same steps as those in FIG. 7 will be denoted with the same step numbers, and a repeated portion will be omitted or briefly explained.

In S241, a face image of a user is obtained by imaging unit 108 of portable terminal device 1. In S242, a face image obtained by user recognition unit 120 is collated with face information of the user registered in user information 102a of memory 102, and portable terminal device 1 recognizes which of the registered users the face image is.

In S201, the current location information is obtained. In S243, an icon of an application of which the security level is set to "L" is read out in accordance with the recognized user name and the classification of the current location by referring to location setting information 102b and application setting information 102c in memory 102.

In S244, icon group 32 of applications of which security levels are "L" obtained in S243 is displayed as the lock screen corresponding to the user name and the current location on display unit 114a of touch panel 114.

Step S204 and subsequent steps are the same as those of the second embodiment (FIG. 7). However, in S222, applications of which security levels are set to "H" are added for each of the user names and the current locations, and icon group 33 is displayed on display unit 114a. In S225, it is permitted to change the home screen to a home screen for another location for the user, but the home screen is prohibited from being changed into a home screen for another user.

In the fourth embodiment, a security level for each application is set in accordance with the user and the location. Accordingly, for example, an application that can be executed by a child without unlocking is restricted, and further, performing unlocking can be restricted.

In the above explanation, a security level for each application is set in accordance with a combination of the user and the location. Alternatively, the security level for each application can be set in accordance with only "user".

Fifth Embodiment

In a fifth embodiment, a new security level is added to the functions of the second embodiment, and an authentication method is changed in accordance with the security level.

FIG. 14 is a figure illustrating an example in which a security level and an authentication method are set for each application. This setting information is registered to application setting information 102c in memory 102. In this example, "home", "workplace", "train station" are registered as the locations, and a security level "M" is added.

Like the security level "H", the added security level "M" indicates that an application has a high security strength and cannot be executed without authentication, but the authentication methods of both are different each other.

As described above, an icon of an application of which security level is "H" is not displayed on home screen in a locked state, and the icon is displayed only after the lock is unlocked with an authentication input. In contrast, an icon of an application of which security level is "M" is displayed even on home screen of a locked state, but it is necessary for the user to perform another authentication input in order to select and execute this icon.

In this example, for example, a simple authentication method A using password authentication and a more confidential authentication method B using face authentication or fingerprint authentication are provided as authentication methods. In the case of the security level "H", the authentication method A is used, and in the case of the security level "M", the authentication method B is used.

For example, when applications of "email" and "setting" are executed at "home" or "workplace", the security level "H" is set, so that the simple authentication method A is used. In contrast, when applications of "email" and "setting" are executed in a place where many unspecified persons are present such as a "train station", the security level is set to "M", and the more confidential authentication method B is used. More specifically, at a location where a password input is easily seen, the face authentication and the fingerprint authentication are used to ensure the security.

FIGS. 15(a) to 15(h) are figures illustrating examples of displays of home screens in the setting of FIG. 14, and FIGS. 15(a) to 15(d) illustrate the locked state, and FIGS. 15(e) to 15(h) illustrate the unlocked state.

In the screen shown in FIG. 15(c) at the "train station" among the lock screens shown in FIGS. 15(a) to 15(d), icon group 32 of "transit", "Map", "search", and "game" of which security level is "L" as well as an icon group 34 of "email" and "setting" of which security level is "M" are displayed. It should be noted that a color, a shape, or the like of an icon is changed so that the user can find that the security levels of both are different each other. In order to select and execute an application of which security level is "M" included in the icon group 34, it is necessary to perform authentication according to the authentication method B such as face authentication.

When the user selects unlock icon 31 and performs authentication according to the authentication method A such as a password, the home screen is switched to the unlock screens shown in FIGS. 15(e) to 15(h), and icon group 33 of which security level is "H" application is displayed.

Figure 16:
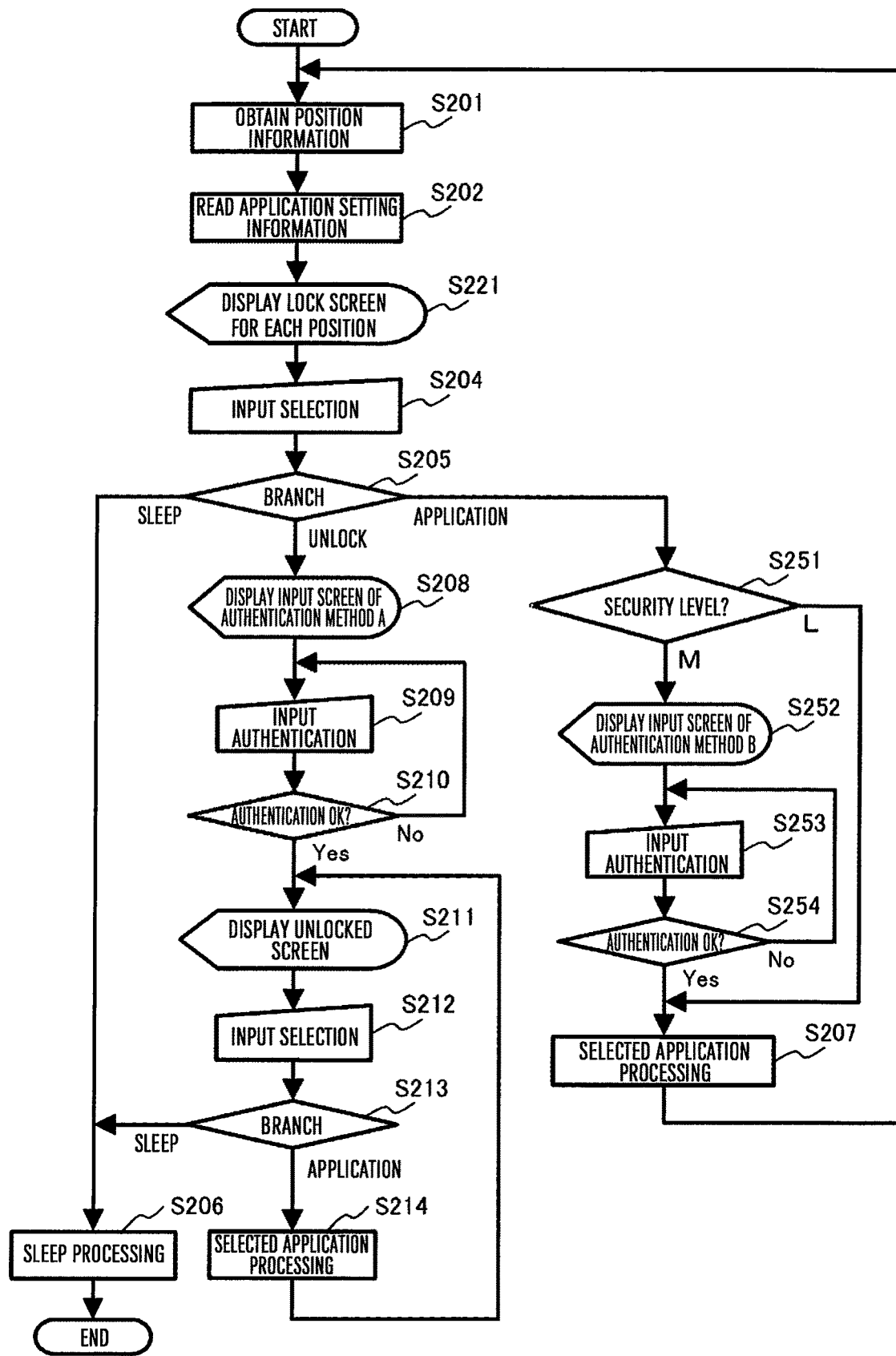
FIG. 16 is a flowchart illustrating an operation of the fifth embodiment.

FIG. 16 is a flowchart illustrating an operation according to the fifth embodiment. The present embodiment is different from the second embodiment (FIG. 7) in that the security level "M" is added and the authentication method is changed. It should be noted that the same steps as those in FIG. 7 will be denoted with the same step numbers, and a repeated portion will be omitted or briefly explained.

S201 to S204 are the same as those in FIG. 7, and in S202, icons of applications of which the security levels are set to "L" and "M" is read out in accordance with the classification of the current location by referring to application setting information 102c. Then, icon groups 32, 34 of which the security levels are set to "L" and "M" and which have been read out are distinguished from each other and displayed on the lock screen in S221.

After the branch processing of S205, the processing for the security level "M" is added to the processing described in FIG. 7.

In a case where the icon of the application displayed on display unit 114a is elected in S204, S251 is subsequently performed, and the security level of the selected application is determined.

In a case where the security level setting is determined to be "L" in the determination of S251, S207 is subsequently performed, and the processing of the application corresponding to the selected icon is executed, and thereafter, S201 is performed again.

In a case where the security level setting is determined to be "M" in the determination of S251, S252 is subsequently performed, and the input screen of the authentication method B is displayed. For example, face authentication based on user recognition unit 120 and fingerprint authentication based on fingerprint sensor (not shown) are used as the authentication method B. In S253, the user inputs authentication information corresponding to the authentication method, and in S254, a determination is made as to whether the input information is valid or not by collating the input information with user information 102a registered in advance. In a case where the input information is determined not to be valid (No), S253 is subsequently performed, and the authentication information is input again. In a case where the input information is determined to be valid (Yes), S207 is subsequently performed, and the processing of the application corresponding to the selected icon is executed, and thereafter, S201 is performed again.

In a case where unlock icon 31 displayed on display unit 114a is selected in S204, S208 is subsequently performed, and a screen for inputting authentication information for unlocking is displayed. On this screen, the authentication method A based on a password or the like is used. In the branch processing of S213, the change of the home screen is deleted, but it may be added as shown in S225.

In the fifth embodiment, a security level for each application is set in accordance with the location, and the authentication method is changed in accordance with the security level, so that the security strength during the authentication input can be enhanced in accordance with the location.

Sixth Embodiment

In a sixth embodiment, the authentication method of unlocking is changed in accordance with the location as compared with the second embodiment.

FIG. 17 is a figure illustrating an example in which the security level for each application and the authentication method of unlocking are set in accordance with the location. This setting information is registered to application setting information 102c in memory 102. In this example, "home", "workplace", and "train station" are registered as the locations, and the authentication method is switched at each location. More specifically, at the locations of "home", "workplace", and "unregistered", a simple authentication method A based on a password authentication or the like is set, and at "train station", a highly confidential authentication method B based on face authentication, fingerprint authentication, or the like is set. Therefore, in a location where many unspecified persons are present and a password input is likely to be seen such as a "train station", the security strength can be enhanced by using the face authentication and the fingerprint authentication.

FIGS. 18(a) to 18(h) are figures illustrating examples of displays of home screens in the setting of FIG. 17, and FIGS. 18(a) to 18(d) illustrate the locked state, and FIGS. 18(e) to 18(h) illustrate the unlocked state.

In the screen at the unregistered location other than the home and the workplace among the lock screens shown in FIGS. 15(a) to 15(d), unlock icon 31A according to the authentication method A is displayed, and at the train station, unlock icon 31B based on the authentication method B is displayed. In this case, the unlock icon preferably has a different color or shape in accordance with the authentication method.

When unlock icon 31A or 31B is selected in each screen, and the authentication is performed in accordance with the authentication method A or the authentication method B, the home screen is switched to the unlock screens as shown in FIGS. 15(e) to 15(h), and icon group 33 additionally including the application of which security level is "H" is displayed.

Figure 19:
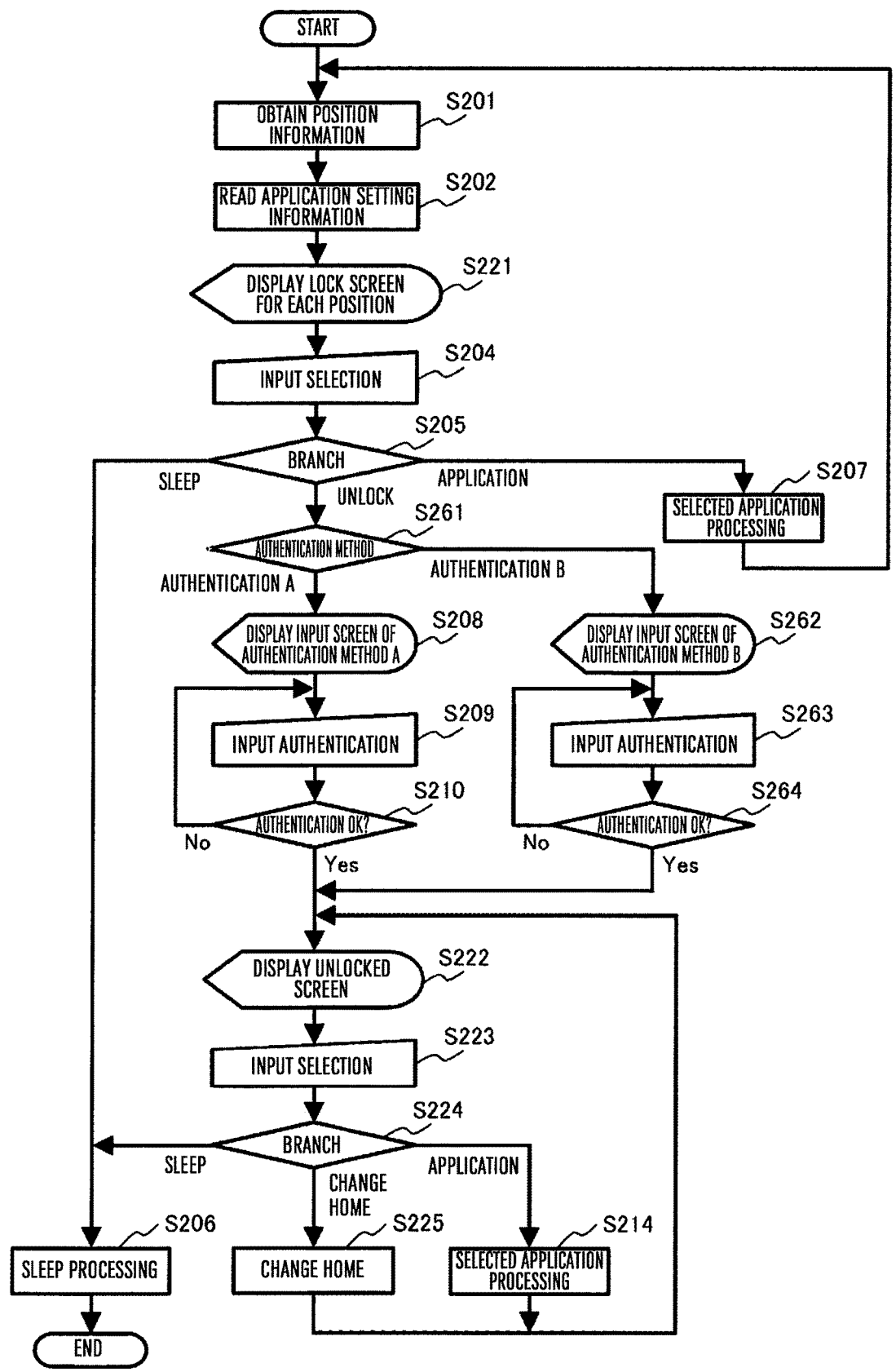
FIG. 19 is a flowchart illustrating an operation according to the sixth embodiment.

FIG. 19 is a flowchart illustrating an operation according to the sixth embodiment. In the present embodiment, the authentication method of unlocking is changed in accordance with the location as compared with the second embodiment (FIG. 7). It should be noted that the same steps as those in FIG. 7 will be denoted with the same step numbers, and a repeated portion will be omitted or briefly explained.

S201 to S204 are the same as those in FIG. 7, and the steps that are changed in the branch processing after S205 are S261 and subsequent steps. In a case where unlock icon 31A or 31B displayed on display unit 114a is selected in S204, S261 is subsequently performed, and the authentication method for unlocking that is set in accordance with the location is determined.

As a result of the determination of S261, in a case of the authentication method A, the input screen corresponding to the authentication method A is displayed S208. In S209, the user inputs the authentication information corresponding to the authentication method A, and in S210, a determination is made as to whether the input information is valid or not by collating the input information with user information 102a registered in advance. In a case where the input information is determined not to be valid (No), S209 is subsequently performed, and the authentication information is input again. In a case where the input information is determined to be valid (Yes), S222 is subsequently performed, and the unlocked home screen is displayed.

As a result of the determination in S261, in a case of the authentication method B, the input screen corresponding to the authentication method B is displayed in S262. In S263, the user inputs authentication information corresponding to the authentication method B, and in S264, a determination is made as to whether the input information is valid or not by collating the input information with user information 102a registered in advance. In a case where the input information is determined not to be valid (No), S263 is subsequently performed, and the authentication information is input again. In a case where the input information is determined to be valid (Yes), S222 is subsequently performed, and the unlocked home screen is displayed. The processing in S222 and subsequent steps are the same as those in FIG. 7.

In the sixth embodiment, the authentication method for unlocking is changed in accordance with the location, so that, like the fifth embodiment, the security strength can be enhanced in accordance with the location where portable terminal device 1 is used.

Each of the embodiments explained above is explained in details in order to explain the present invention in an easy to understand manner, and the present invention does not necessarily have all the configurations explained above. For example, in the present embodiment, the location information is explained with GPS receiver unit 104. However, the present invention is not limited thereto. The location information about base station 3 may be obtained via base station communication unit 117, or the location information about access point 2 of the wireless communication may be obtained via wireless communication unit 118. As a current time obtaining method, the time information may be obtained by connecting with the Network Time Protocol (NTP) server.

Further, in each of the embodiments, two or three settings are provided as the security level of the application, but the present invention is not limited thereto. Three or more settings may be provided, and with a setting of a security level for each application, the length of the password may be changed or the authentication method may be changed in accordance with the location, the time, or the user.

In the above embodiments, an icon of an application that is frequently used at the registered location is displayed on the home screen in the locked state and the unlocked state, so that a desired application can be quickly selected and executed even in a state where many applications are installed on the portable terminal device.

On the display of the home screen in the locked state, the unlock icon is displayed and selected, but an operation button for unlocking may be provided separately.

Some of the elements in each embodiment may be added to other elements, or may be deleted or replaced with other elements. A part or all of the configurations, functions, processing units, processing means, or the like may be achieved with hardware by, e.g., designing an integrated circuit. Alternatively, each of the configurations, functions, or the like may be achieved with software by interpreting and executing a program with which a processor achieves each of the functions. Information such as a program, a table, a file, or the like achieving each function may be placed in memory 102 or storage 103.

Control lines and information lines that are considered to be necessary for explanation are shown, but not all the control lines and information lines required in terms of products are necessarily shown. Substantially almost all the constituent elements may be considered to be connected with each other in reality.

REFERENCE SIGNS LIST

1 . . . portable terminal device, 30 . . . location information, 31 . . . unlock icon, 32, 33, 34 . . . icon group, 101 . . . control unit, 102 . . . memory, 102a . . . user information, 102b . . . location setting information, 102c . . . application setting information, 104 . . . GPS receiver unit, 108 . . . imaging unit, 114 . . . touch panel, 114a . . . display unit, 114b . . . operation input unit, 115 . . . operation button, 119 . . . timer unit, 120 . . . user recognition unit.

The invention claimed is:

1. A portable terminal executing an application in accordance with a selection made by a user, the portable terminal comprising:
   a locator detecting current location information of the portable terminal;
   a storage storing a setting information including a location information for each of a plurality of applications;
   a display displaying respective icons of the applications that are selectable by the user; and
   a controller controlling the locator, the storage and the display, and executing the application selected by the user;
   wherein the setting information stored in the storage is referred by the controller to determine whether to display the respective icons of the applications on the display and whether to allow execution of the respective applications in a locked state and an unlocked state of the portable terminal,
   wherein the controller is configured to:
   based on the setting information and the current location information, determine a combination of icons of the applications that are to be displayed on the display and an other combination of icons of the applications that are not to be displayed on the display in a condition that the portable terminal is in the locked state,
   adjust respective positions of the icons of the applications determined to be displayed on the display, and execute the application selected by the user.

2. The portable terminal according to claim 1,
   wherein the controller is further configured to:
   in the locked state, display the combination of icons of the applications that are determined to be displayed in the locked state and an UI object which indicates that the portable terminal is in the locked state, and in the unlocked state, display both the combination of icons of the applications that are determined to be displayed in the locked state and the other combination of icons of the applications that are determined not to be displayed in the locked state.

3. The portable terminal according to claim 1,
wherein the setting information includes information for causing the portable terminal not to display an application on the display and restrict an execution of the application in any of the locked state and the unlocked state.

4. The portable terminal according to claim 1,
wherein the controller switches an authentication method for unlocking and an authentication method for allowing the application selected by the user to be executed, on the basis of the setting information stored in the storage.

5. The portable terminal according to claim 1,
wherein the setting information includes information of an authentication method for unlocking in such a manner that the authentication method is different in accordance with the location, and
the controller refers to the authentication method to switch the authentication method for unlocking in accordance with the current location information.

6. The portable terminal according to claim 3,
wherein the controller switches an authentication method for unlocking and an authentication method for allowing the application selected by the user to be executed, on the basis of the setting information stored in the storage.

7. The portable terminal according to claim 3,
wherein the setting information includes information of an authentication method for unlocking in such a manner that the authentication method is different in accordance with the location, and
the controller refers to the authentication method to switch the authentication method for unlocking in accordance with the current location information.

8. A method of executing an application of a portable terminal in accordance with a selection made by a user, comprising the steps of:
  detecting current location information of the portable terminal;
  storing setting information including location information for each of a plurality of applications;
  displaying respective icons of the applications that are selectable by the user;
  determining, based on the setting information stored in the storage, whether to display the respective icons of the applications on the display and whether to allow execution of the respective applications in a locked state and an unlocked state of the portable terminal,
  determining, based on the setting information and the current location information, a combination of icons of the applications that are to be displayed on the display and an other combination of icons of the applications that are not to be displayed on the display in a condition that the portable terminal is in the locked state,
  adjusting respective positions of the icons of the applications determined to be displayed on the display, and
  executing the application selected by the user.

9. The method of executing an application of a portable terminal according to claim 8, further comprising,
  in the locked state, displaying the combination of icons of the applications that are determined to be displayed in the locked state and a UI object which indicates that the portable terminal is in the locked state, and
  in the unlocked state, displaying both the combination of icons of the applications that are determined to be displayed in the locked state and the other combination of icons of the applications that are determined not to be displayed in the locked state.

10. The method of executing an application of a portable terminal according to claim 8,
  wherein the storing of the setting information includes storing information for causing the portable terminal not to display an application on the display and restrict an execution of the application in any of the locked state and the unlocked state.

11. The method of executing an application of a portable terminal according to claim 8, further comprising:
  switching an authentication method for unlocking and an authentication method for allowing the application selected by the user to be executed, on the basis of the setting information stored in the storage.

12. The method of executing an application of a portable terminal according to claim 8, further comprising,
  in the storing of the setting information, storing information of an authentication method for unlocking in such a manner that the authentication method is different in accordance with the location, and
  switching the authentication method to the authentication method for unlocking in accordance with the current location information.

13. The method of executing an application of a portable terminal according to claim 10, further comprising:
  switching an authentication method for unlocking and an authentication method for allowing the application selected by the user to be executed, on the basis of the setting information stored in the storage.

14. The method of executing an application of a portable terminal according to claim 10, further comprising,
  in the storing of the setting information, storing information of an authentication method for unlocking in such a manner that the authentication method is different in accordance with the location, and
  switching the authentication method to the authentication method for unlocking in accordance with the current location information.

\* \* \* \* \*